United States Patent
Rydgren et al.

(10) Patent No.: US 7,288,149 B2
(45) Date of Patent: Oct. 30, 2007

(54) AQUEOUS CEMENT COMPOSITION

(75) Inventors: Hans Rydgren, Nol (SE); Kjell Stridh, Stenungsund (SE)

(73) Assignee: Akzo Nobel N.V., Arnhem (NL)

( * ) Notice: Subject to any disclaimer, the term of this patent is extended or adjusted under 35 U.S.C. 154(b) by 554 days.

(21) Appl. No.: 10/497,371

(22) PCT Filed: Nov. 26, 2002

(86) PCT No.: PCT/SE02/02164

§ 371 (c)(1),
(2), (4) Date: Jun. 3, 2004

(87) PCT Pub. No.: WO03/048070

PCT Pub. Date: Jun. 12, 2003

(65) Prior Publication Data

US 2005/0000391 A1    Jan. 6, 2005

(30) Foreign Application Priority Data

Dec. 3, 2001 (SE) .................................. 0104048

(51) Int. Cl.
  *C04B 16/00* (2006.01)
  *C04B 24/00* (2006.01)
(52) U.S. Cl. ................ 106/730; 106/172.1; 106/162.8; 106/162.82; 536/56; 536/84
(58) Field of Classification Search ................ 106/730, 106/172.1, 162.8, 162.82; 536/56, 84
See application file for complete search history.

(56) References Cited

U.S. PATENT DOCUMENTS 5,234,968 A    8/1993  Debus et al. ................ 524/42
5,372,642 A    12/1994 Bartz et al. ................ 106/730

FOREIGN PATENT DOCUMENTS

FR    2709122 A1    2/1995
JP    8026801 A     1/1996
JP    9012379 A     1/1997

OTHER PUBLICATIONS

International Prelimary Examination Report; PCT/SE02/02164; International Filing date Nov. 26, 2002; Priority Date Dec. 3, 2001; 3 pages.
International Search Report, No. PCT/WO 03/048070 A1, Jun. 12, 2003.
Abstract of JP 200203915A.
Abstract of JP 8026801A.
Abstract of JP 9012379A.
Abstract of FR 2709122A1.
Ullmann's Encyclopedia of Industrial Chemistry, Fifth, Completely Revised Edition vol. A5, pp. 468-474.
DIN 18156 Part 2; Mar. 1978; pp. 1-4.
ASTM C91-71; "Standard Specification for Masonry Cement"; American National Standards Institute; Aug. 30, 1971; pp. 55-61.
ASTM C230-68 ; "Standard Specification For Flow Table For Use In Tests Of Hydraulic Cement"; American National Standards Institute; Sep. 13, 1968; pp. 200-205.

*Primary Examiner*—Paul Marcantoni
(74) *Attorney, Agent, or Firm*—Ralph J. Mancini; Michelle J. Burke

(57) ABSTRACT

A fresh aqueous cement composition suitable for building purposes is described. It contains, besides a hydraulic cement, a methyl ethyl cellulose ether having a DS methyl of 0.4-2.2, a DS ethyl of 0.05-0.8 and a MS hydroxy-($C_2$-$C_3$)-alkyl of 0-2. The celulose ether imparts excellent rheology properties, including a high water-retention combined with a long open time, to the cement composition. A dry blend and a rheology additive containing the cellulose ether are also described.

14 Claims, No Drawings

AQUEOUS CEMENT COMPOSITION

This application claims priority of PCT Application No. PCT/SE02/02164, filed Nov. 26, 2002, and Swedish Patent Application No. 0104048-4, filed Dec. 3, 2001.

The present invention relates to a fresh aqueous cement composition suitable for building purposes. It contains a methyl ethyl cellulose ether, which imparts excellent rheology properties, including a high water-retention combined with a long open time, to the cement composition.

Non-ionic cellulose ethers, such as methyl cellulose ethers, methyl hydroxyethyl cellulose ethers and methyl hydroxypropyl cellulose ethers, are frequently used in fresh cement mortars as a water-retention and thickening agent. The methyl cellulose ethers also improve such rheology properties as workability, stability and adhesion. Other commercially available cellulose ethers for modern cement-based compositions are ethyl hydroxyethyl cellulose ethers. It is also well known to combine the cellulose ethers with synthetic polymers, e.g. polyacrylamides and polyvinyl alcohols, in order to further improve the properties of the fresh cement mortars. See for example U.S. Pat. No. 5,234,968.

It is also of essential importance that the fresh cement composition has an open time necessary for the work to be done in a practical manner and a satisfactory adhesion and that the fresh cement composition, after curing, results in a product of good strength.

According to the present invention it has now been found that a fresh, aqueous cement composition containing a hydraulic cement and a methyl ethyl cellulose ether, having a DS methyl of 0.4-2.2, preferably 0.6-1.8; a DS ethyl of 0.05-0.8, preferably 0.1-0.5; and a hydroxy-($C_2$-$C_3$)-alkyl of 0-2, preferably 0.1-1.2; exhibits good rheology properties, such as a high water-retention combined with a long open time, a good adhesion and a high strength of the cured product. The amount of the methyl ethyl cellulose ether is suitably from 0.05-3%, preferably 0.1-2%, and most preferably from 0.2-1.0, by weight of the dry weight of the fresh cement composition.

The methyl ethyl cellulose ether has advantageously a flocculation temperature between 55° C. and 85° C., preferably between 60° C. and 80° C., while the viscosity suitably is between 200 mPa·s and 20000 mPa.s, measured in a 1% by weight solution at 20° C. according to Brookfield LV, spindle 1-4, 12 rpm.

The presence of both methyl and ethyl groups in the cellulose ether prolongs the open time of the fresh cement composition that is available without undue degree of reduction of the adhesion and the strength of the cured product. The presence of hydroxyethyl or hydroxypropyl groups does not suppress but normally improves these properties further. In addition, the use of the celluloseether in question in the cement composition results in an air entrainment that supports an excellent consistency of the fresh cement composition and a good resistency towards formation of cracks in the cured product. The cement composition of the invention has properties, which make them suitable to be used as a cement mortar, such as plaster, joint fillers, floor screeds, grouts, and tile adhesives.

The methyl ethyl cellulose ether disclosed can be produced by reacting an alkali cellulose with methyl chloride, ethyl chloride and optionally ethylene oxide and/or propylene oxide. Suitably the reaction is performed in the presence of an inert organic reaction medium at temperatures between 60-115° C. in accordance with the principles disclosed in the textbook: Ullmann's Encyclopaedia of Industrial Chemistry, Fifth, Completely Revised Edition Volume A5, p 468-474.

According to the invention, the hydraulic cement can be ordinary Portland cement, low heat Portland cement, white Portland cement, rapid hardening Portland cement, and aluminous cement, or mixtures thereof. Suitably the hydraulic cement contains 75-100% by weight of ordinary Portland cement or white Portland cement. The hydraulic cement can also be combined with 0-25% by weight of lime and/or gypsum. In general, the cement composition also contains fillers, although for certain applications, such as cement glue for mosaic, the presence of fillers may not be required or desired. The fillers are usually an inorganic material with a particle size of 5 mm or less. The inorganic material is preferably selected from the group consisting of silica, calciumcarbonate, different types of dolomite and expanded minerals. The fillers for use in plasters suitably comprise at least 98% by weight of particles having a particle size less than 4 mm, while fillers for tile adhesives, grouts, joint fillers and floor screeds normally comprise at least 98% by weight of particles having a particle size less than 1.5 mm.

According to the invention the cement composition can, besides the methyl ethyl cellulose ether, also contain other additives which affect the rheology. Examples of such other additives are other polymers consisting of water-soluble or water-dispersable synthetic organic polymers resistant to alkali, such as polyvinyl-acetates, polyvinyl alcohols, polyacrylamides, copolymers between vinyl acetate and vinyl alcohol, copolymers between vinyl acetate, vinyl chloride and vinyl laurate, copolymers between acrylates and methyl methacrylates, anionic or nonionic starch derivates, polymeric plasticizers and mixtures thereof; and clays, such as kaolin, bentonite, attapulgite and mixtures thereof. These additives have normally a thickening effect and improve the stability of the fresh cement composition and the flexibility of the cured product, thereby reducing the risk of crack formation. A suitable rheology additive for use in a fresh composition according to the invention comprises 10-100%, preferably 40-90% by weight of a methyl ethyl cellulose ether according to the invention, 0-90%, preferably 10-60% by weight of another polymer consisting of water-soluble or water-dispersible synthetic organic polymer resistant to alkali, and 0-90%, preferably 0-50% by weight of clay.

In addition to the above mentioned components the cement composition can also contain a number of other ingredients, such as air-entraining agents, retarders, accelerators, nonpolymeric plasticizers, pigments, colorants and corrosion inhibitors.

A typical fresh cement composition according to the invention contains 0.05-3%, preferably 0.1-2% and most preferably 0.2-1%, by dry weight of the composition of a rheology additive containing a methyl ethyl cellulose ether as defined above, 8-99.5, preferably 12-65% by dry weight of the composition of a hydraulic cement, 0-91, preferably 45-83% by dry.weight of the composition of a filler having a particle size of 5 mm or less, 0-10, preferably 0.05-4% by dry weight of the composition of other ingredients, and 10-60, preferably 15-40% by weight of the fresh cement composition of water.

The fresh composition may be prepared by first mixing at least a part of the cement with the rheology additive and the other ingredients, whereupon the remaining cement and the filler is added in one or more steps and thoroughly mixed to a homogeneous dry blend. Just before the actual use of the fresh cement composition a suitable amount of the dry blend is thoroughly mixed with the desired amount of water.

The present invention is further illustrated in the following examples.

EXAMPLE 1

Five cement compositions suitable to be used as a tile fix mortar were prepared by mixing according to DIN 18156, 400 g of ordinary Portland cement; 525 g of sand having a particle size of less and 0.5 mm and 75 g of siliceous fluor having a particle size of less than 0.5 mm as a filler; 4 g of any one of the nonionic cellulose ethers according to Table 1 below; and 235 g of water.

TABLE I

Nonionic cellulose ethers used in the compositions

| Property | Compositions | | | | |
|---|---|---|---|---|---|
| | 1 | 2 | A | B | C |
| DS methyl | 1.35 | 1.35 | 1.5 | 1.5 | 1.6 |
| DS ethyl | 0.12 | 0.12 | 0 | 0 | 0 |
| MS hydroxyethyl | 0.12 | 0.06 | 0.12 | 0.06 | 0 |
| MS hydroxypropyl | 0 | 0 | 0 | 0 | 0.2 |
| Viscosity[1], mPa · s | 7830 | 11800 | 11500 | 12400 | 3720 |
| Flocculation temperature, °C. | 69 | 67 | 68 | 68 | 61 |

[1] Viscosity measured according to Brookfield LV, spindle 1–4, 12 rpm in 1% by weight solution at 20° C.

The properties of the cement composition were examined with regard to air content (by density measurements), flow table value (ASTM C280-68), slip ($UEAT_c$), open time measured as tensile strength on non-vitreous tiles (DIN 18156, part 2). The tiles were applied after 0.5 and 10 minutes and the tensile strength measured after 28 days. The results obtained are shown in Table II below.

TABLE II

Performance of the cement compositions

| Property | Compositions | | | | |
|---|---|---|---|---|---|
| | 1 | 2 | A | B | C |
| Air content, % | 15.0 | 14.1 | 14.5 | 13.7 | 15.8 |
| Flow table value, mm | 160 | 159 | 158 | 157 | 167 |
| Slip, mm | 1 | 1 | 2 | 2 | 1 |
| Open time as tensile strength, kg/cm² | | | | | |
| 0 min | 24.8 | 23.8 | 24.6 | 13.9 | 22.6 |
| 5 min | 18.1 | 20.2 | 10.5 | 9.8 | 15.7 |
| 10 min | 12.0 | 10.8 | 7.8 | 8.1 | 7.1 |

From the results it is evident that the open times during which a high tensile strength are obtainable is essential longer for the cement compositions 1 and 2 according to the invention than for the comparison compositions A, B and C.

EXAMPLE 2

Three cement compositions were prepared according to the formula in Example 1 but the amount of water was increased to 240 g. The nonionic cellulose ethers exhibited the following properties.

TABLE III

Nonionic cellulose ethers used in the cement compositions

| Property | Compositions | | |
|---|---|---|---|
| | 3 | 4 | D |
| DS methyl | 1.2 | 1.5 | 1.8 |
| DS ethyl | 0.25 | 0.25 | 0 |
| MS hydroxyethyl | 0.12 | 0.12 | 0.12 |
| Viscosity, mPa · s | 16900 | 17700 | 18900 |
| Flocculation temperature, °C. | 64.5 | 61.7 | 64.6 |

The properties of the cement compositions were examined in the same manner as in Example 1, but with the exception that the air content was not measured. The following results were obtained.

TABLE IV

Performance of the cement compositions

| Property | Compositions | | |
|---|---|---|---|
| | 3 | 4 | D |
| Flow table value, mm | 141 | 140 | 138 |
| Slip, mm | 2 | 3 | 2 |
| Open time as tensile strength, kg/cm² | | | |
| 0 min | 21.7 | 25.8 | 21.9 |
| 5 min | 17.1 | 23.8 | 9.8 |
| 10 min | 7.6 | 5.4 | 0.8 |

The compositions 3 and 4 according to the invention exhibited essential better open times than the comparison composition D.

EXAMPLE 3

Two cement compositions were prepared in accordance with Example 1, but the water content was adjusted so the cement compositions received a slip between 0.5 mm and 1 mm. Furthermore, two similar cement compositions were prepared. The difference was that these compositions as a rheology additive contained a blend of 4 g of any of the cellulose ethers and 0.08 g of a polyacrylamide. The rheology additive used in the four cement compositions are shown in Table V.

TABLE V

Rheology additive used in the compositions

| Components | Compositions | | | |
|---|---|---|---|---|
| | 6 | 7 | E | F |
| Cellulose ether, g | 4 | 4 | 4 | 4 |
| DS methyl | 0.9 | 0.9 | — | — |
| DS ethyl | 0.35 | 0.35 | 0.95 | 0.95 |

TABLE V-continued

Rheology additive used in the compositions

| Components | Compositions | | | |
|---|---|---|---|---|
| | 6 | 7 | E | F |
| MS hydroxyethyl | 0.9 | 0.9 | 2.35 | 2.35 |
| Viscosity, cP | 2100 | 2100 | 6000 | 6000 |
| Flocculation, ° C. | 70.1 | 70.1 | 69 | 69 |
| Polyacrylamide, g | — | 0.08 | — | 0.08 |

The air content, slip, flow table value and open time of the four cement compositions were determined in the same manner as in Example 1. Furthermore, the water-retention was determined according to ASTM C91-71 (modified with a funnel diameter of 80 mm and an evacuation for 10 minutes). The following results were obtained.

TABLE VI

Performance of the cement compositions

| Property | Compositions | | | |
|---|---|---|---|---|
| | 6 | 7 | E | F |
| Water addition, g | 220 | 250 | 225 | 255 |
| Air content, % | 24 | 20 | 22 | 23 |
| Flow table value, mm | 158 | 164 | 154 | 154 |
| Slip, mm | 1 | 0.5 | 1 | 0.5 |
| Open time as tensile strength, kg/cm$^2$ | | | | |
| 0 min | 21.8 | 21.1 | 12.7 | 12.0 |
| 5 min | 16.6 | 12.7 | 10.6 | 6.0 |
| 10 min | 7.2 | 6.5 | 4.3 | 0.0 |
| Water retention, % | 97.1 | 96.7 | 97.2 | 96.1 |

The cement compositions 6 and 7 according to the invention have essentially better open time property than the comparisons E and F. Water-retention values between 94% and 98% are excellent.

The invention claimed is:

1. A fresh aqueous cement composition comprising a hydraulic cement and a cellulose ether, wherein the composition comprises a methyl ethyl cellulose ether having a DS methyl of 0.4-2.2, a DS ethyl of 0.05-0.8 and a MS hydroxy-($C_2$-$C_3$)-alkyl of 0-2.

2. The cement composition of claim 1 wherein the methyl ethyl cellulose ether has a DS methyl of 0.6-1.8, a DS ethyl of 0.1-0.5 and a MS hydroxy-($C_2$-$C_3$)-alkyl of 0.1-1.2.

3. The cement composition of claim 2 wherein the hydroxyalkyl group is hydroxyethyl.

4. The cement composition of claim 2 wherein the hydroxyalkyl is hydroxypropyl.

5. The cement composition of claim 1 wherein the composition contains about 0.05% to about 3% by dry weight of the methyl ethyl cellulose ether.

6. The cement composition of claim 1 wherein the composition comprises about 0.05% to about 3% by dry weight of the methyl ethyl cellulose ether; about 8% to about 99.5% by dry weight of the composition of the hydraulic cement; 0 to about 91% by dry weight of the composition of a filler having a particle size of 5 mm or less; and about 10% to about 60% by weight of the composition of water.

7. The cement composition of claim 6 further comprising about 0 to about 10% by dry weight of the composition of an ingredient selected from the group consisting of air-entraining agents, retarders, accelerator, nonpolymeric plasticizers, pigments, colorants, corrosion inhibitors, and mixtures thereof.

8. The cement composition of claim 6 comprising about 0.1% to about 2% by dry weight of the methyl ethyl cellulose ether; about 12% to about 65% by dry weight of the composition of the hydraulic cement, about 45% to about 83% by dry weight of the composition of the filler; and about 15% to about 40% by weight of the composition of water.

9. The cement composition of claim 8 further comprising about 0.05% to about 10% by dry weight of the composition of an ingredient selected from the group consisting of air-entraining agents, retarders, accelerator, nonpolymeric plasticizers, pigments, colorants, corrosion inhibitors, and mixtures thereof.

10. A dry blend for use in the preparation of a fresh cement composition, wherein the dry blend comprises
    (i) about 0.05% to about 3% by dry weight of a methyl ethyl cellulose ether having a DS methyl of 0.4-2.2, a DS ethyl of 0.05-0.8 and a MS hydroxy-($C_2$-$C_3$)-alkyl of 0-2;
    (ii) about 8% to about 99.5% by dry weight of the composition of a hydraulic cement; and
    (iii) 0 to about 91% by dry weight of the composition of a filler having a particle size of 5 mm or less.

11. The dry blend of claim 10 further comprising 0 to about 10% by dry weight of the composition of an ingredient selected from the group consisting of air-entraining agents, retarders, accelerator, nonpolymeric plasticizers, pigments, colorants, corrosion inhibitors, and mixtures thereof.

12. The dry blend of claim 10 comprising about 0.1 to about 2% by dry weight of the methyl ethyl cellulose ether; about 12 to about 65% by dry weight of the composition of the hydraulic cement; about 45 to about 83% by dry weight of the composition of the filler; and about 0.05 to about 4% by dry weight of the composition of an ingredient selected from the group consisting of air-entraining agents, retarders, accelerators, nonpolymeric plasticizers, pigments, colorants, corrosion inhibitors and mixtures thereof.

13. A rheology additive for use in a fresh cement composition or dry blend, said rheology additive comprising:
    (i) about 40 to about 98.5% by dry weight of a methyl ethyl cellulose ether having a DS methyl of 0.4-2.2, a DS ethyl of 0.05-0.8 and a MS hydroxy-($C_2$-$C_3$)-alkyl of 0-2;
    (ii) about 1.5 to about 60% by weight of a water-soluble or water-dispersible synthetic organic polymer resistant to alkali; and
    (iv) 0 to about 50% by weight of clay.

14. The cement composition of claim 1 which additionally comprises
    (i) about 1.5 to about 60% by weight of a water-soluble or water-dispersible synthetic organic polymer resistant to alkali; and
    (iv) 0 to about 50% by weight of clay.

* * * * *